United States Patent
Chen et al.

(10) Patent No.: US 10,204,094 B2
(45) Date of Patent: *Feb. 12, 2019

(54) INSERTING NEW ELEMENTS IN A TABULAR DATA STRUCTURE

(71) Applicant: International Business Machines Corporation, Armonk, NY (US)

(72) Inventors: Xiao Ling Chen, Beijing (CN); Chuan He, Beijing (CN); Yan Huang, Beijing (CN); Jiang Yi Liu, Beijing (CN); Chong Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/970,923

(22) Filed: May 4, 2018

(65) Prior Publication Data

US 2018/0232349 A1    Aug. 16, 2018

Related U.S. Application Data

(63) Continuation of application No. 15/653,617, filed on Jul. 19, 2017, now Pat. No. 9,996,518, which is a
(Continued)

(51) Int. Cl.
*G06F 17/20* (2006.01)
*G06F 17/24* (2006.01)
*G06F 3/0484* (2013.01)

(52) U.S. Cl.
CPC ........ *G06F 17/245* (2013.01); *G06F 3/04842* (2013.01); *G06F 17/246* (2013.01)

(58) Field of Classification Search
CPC .... G06F 3/048–3/04897; G06F 17/245; G06F 17/246
See application file for complete search history.

(56) References Cited

U.S. PATENT DOCUMENTS 8,773,370 B2    7/2014   Hogan
2006/0136807 A1*  6/2006   Yalovsky .............. G06F 17/245
                                                   715/209
(Continued)

FOREIGN PATENT DOCUMENTS

CN     102243624 A    11/2011
CN     102629180 A    8/2012
(Continued)

OTHER PUBLICATIONS

Ringstrom, David, "Quick Tips for Inserting Excel Rows and Columns", Mar. 22, 2013, 20 pages, <http://www.accountingweb.com/technology/excel/quick-tips-for-inserting-excel-rows-and-columns>.
(Continued)

*Primary Examiner* — Keith D Bloomquist
(74) *Attorney, Agent, or Firm* — Edward J. Wixted, III

(57) ABSTRACT

Embodiments of the present invention provide a method to quickly insert new rows or columns in a tabular data structure (such as a spreadsheet, or a table). The user expands a row height (or a column width). The expanded row (or column width) is automatically displayed with proposed divisions (for example, represented with dashed lines). The user indicates acceptance of the proposed divisions. The expanded row (or column) is automatically divided into multiple rows (or columns) as indicated by the proposed divisions.

1 Claim, 7 Drawing Sheets

Related U.S. Application Data continuation of application No. 15/230,503, filed on Aug. 8, 2016, now Pat. No. 10,025,768.

(56) References Cited

U.S. PATENT DOCUMENTS

| | | | |
|---|---|---|---|
| 2010/0042684 A1* | 2/2010 | Broms | G06F 3/0483 709/204 |
| 2012/0180002 A1 | 7/2012 | Campbell et al. | |
| 2014/0033093 A1* | 1/2014 | Brauninger | G06F 3/04883 715/765 |
| 2014/0164896 A1 | 6/2014 | Schlereth | |
| 2014/0372856 A1* | 12/2014 | Radakovitz | G06F 17/246 715/220 |
| 2014/0372857 A1* | 12/2014 | Otero | G06F 9/453 715/220 |
| 2015/0161095 A1* | 6/2015 | Wang | G06F 17/246 715/212 |
| 2015/0363378 A1* | 12/2015 | Dolph | G06F 17/2288 715/212 |
| 2018/0039612 A1 | 2/2018 | Chen et al. | |
| 2018/0039613 A1 | 2/2018 | Chen et al. | |

FOREIGN PATENT DOCUMENTS

| | | |
|---|---|---|
| CN | 102637118 A | 8/2012 |
| CN | 102799576 A | 11/2012 |
| CN | 102637118 B | 11/2015 |
| WO | 2013163920 A1 | 11/2013 |

OTHER PUBLICATIONS

"Google Sheets: Modifying Columns, Rows, and Cells", © 1998-2016 Goodwill Community Foundation, Inc., <http://www.gcflearnfree.org/googlespreadsheets/9.4>, printed Apr. 29, 2016, 8 pages.

Chen et al., "Inserting New Elements in a Tabular Data Structure", U.S. Appl. No. 15/970,955, filed May 5, 2018, 30 pages.

IBM "List of Patent Applications Treated as Related" Appendix P, Filed Herewith, 2 pages.

* cited by examiner

|   | A | B | C | D | E | F | G |
|---|---|---|---|---|---|---|---|
| 1 | A1 | B1 | C1 | D1 | | | |
| 2 | A2 | B2 | C2 | D2 | | | |
| 3 | A3 | B3 | C3 | D3 | | | |
| 4 | A4 | B4 | C4 | D4 | | | |
| 5 | A5 | B5 | C5 | D5 | | | |
| 6 | A6 | B6 | C6 | D6 | | | |
| 7 | A7 | B7 | C7 | D7 | | | |
| 8 | | | | | | | |

610

|   | A | B | C | D | E | F | G |
|---|---|---|---|---|---|---|---|
| 1 | A1 | B1 | C1 | D1 | | | |
| 2 | A2 | B2 | C2 | D2 | | | |
| 3 | A3 | B3 | C3 | D3 | | | |
| 4 | A4 | B4 | C4 | D4 | | | |
| 5 | A5 | B5 | C5 | D5 | | | |
| 6 | A6 | B6 | C6 | D6 | | | |
| 7 | A7 | B7 | C7 | D7 | | | |
| 8 | | | | | | | |

620

|   | A | B | C | D | E | F | G |
|---|---|---|---|---|---|---|---|
| 1 | A1 | B1 | C1 | D1 | | | |
| 2 | A2 | B2 | C2 | D2 | | | |
| 3 | A3 | B3 | C3 | D3 | | | |
| 4 | A4 | B4 | C4 | D4 | | | |
| 5 | A5 | B5 | C5 | D5 | | | |
| 6 | A6 | B6 | C6 | D6 | | | |
| 7 | A7 | B7 | C7 | D7 | | | |

630

|   | A | B | C | D | E | F | G |
|---|---|---|---|---|---|---|---|
| 1 | A1 | B1 | C1 | D1 | | | |
| 2 | A2 | B2 | C2 | D2 | | | |
| 3 | A3 | | | | B3 | C3 | D3 |
| 4 | A4 | | | | B4 | C4 | D4 |
| 5 | A5 | | | | B5 | C5 | D5 |
| 6 | A6 | B6 | C6 | D6 | | | |
| 7 | A7 | B7 | C7 | D7 | | | |

INSERTING NEW ELEMENTS IN A TABULAR DATA STRUCTURE

BACKGROUND OF THE INVENTION

The present invention relates generally to the field of computer application software user interfaces, and more particularly to user interfaces for table-related applications such as spreadsheets.

The Wikipedia entry for "Spreadsheet" (as of Jun. 22, 2016) states as follows: "A spreadsheet is an interactive computer application for organization, analysis and storage of data in tabular form. Spreadsheets are . . . computerized simulations of paper accounting worksheets. [A spreadsheet] operates on data entered in cells of a table. Each cell may contain either numeric or text data, or the results of formulas that automatically calculate and display a value based on the contents of other cells."

SUMMARY

A method, computer program product and/or system, for inserting one or more tabular elements in a tabular data structure, performs the following operations (not necessarily in the following order): (i) receiving a first user input indicating an increase in the size of a tabular element relative to at least one dimension; (ii) determining an expanded tabular element size from the first user input; (iii) determining a number of proposed tabular elements that would fit within the expanded tabular element size; and (iv) displaying the proposed tabular elements.

BRIEF DESCRIPTION OF THE DRAWINGS

FIG. 6 is a series of screenshots depicting an array of cells insertion sequence in accordance with at least one embodiment of the present invention.

DETAILED DESCRIPTION

Embodiments of the present invention provide a method to quickly insert new rows or columns in a tabular data structure (such as a spreadsheet), the method comprising: (i) a user expands a row height (or a column width); (ii) the expanded row or column is automatically displayed with proposed divisions (for example, by displaying dashed lines); (iii) the user indicates acceptance of the proposed divisions; (iv) the expanded row (or column) is automatically divided into multiple rows (or columns) as indicated by the proposed divisions. The present invention will now be described in detail with reference to the Figures.

It will be understood by one skilled in the relevant art, that a tabular data structure is any type of data structure wherein the data can be represented as cells arranged in rows and columns. Examples of tabular data structures include: (i) a spreadsheet; (ii) a table in a word processing application; (iii) a table in a web page, such as a table defined with hypertext markup language (HTML); and (iv) a table in a relational database. Embodiments of the present invention generally apply to software applications that are used to create, display, edit and/or update tabular data structures. Examples of such software applications include spreadsheet applications, word processing applications, web development applications, and database applications.

For convenience throughout this document, the term "tabular element" refers to at least a table cell, a table row, a table column, or a contiguous rectangular array of cells of cells corresponding to a tabular data structure.

Figure 1:
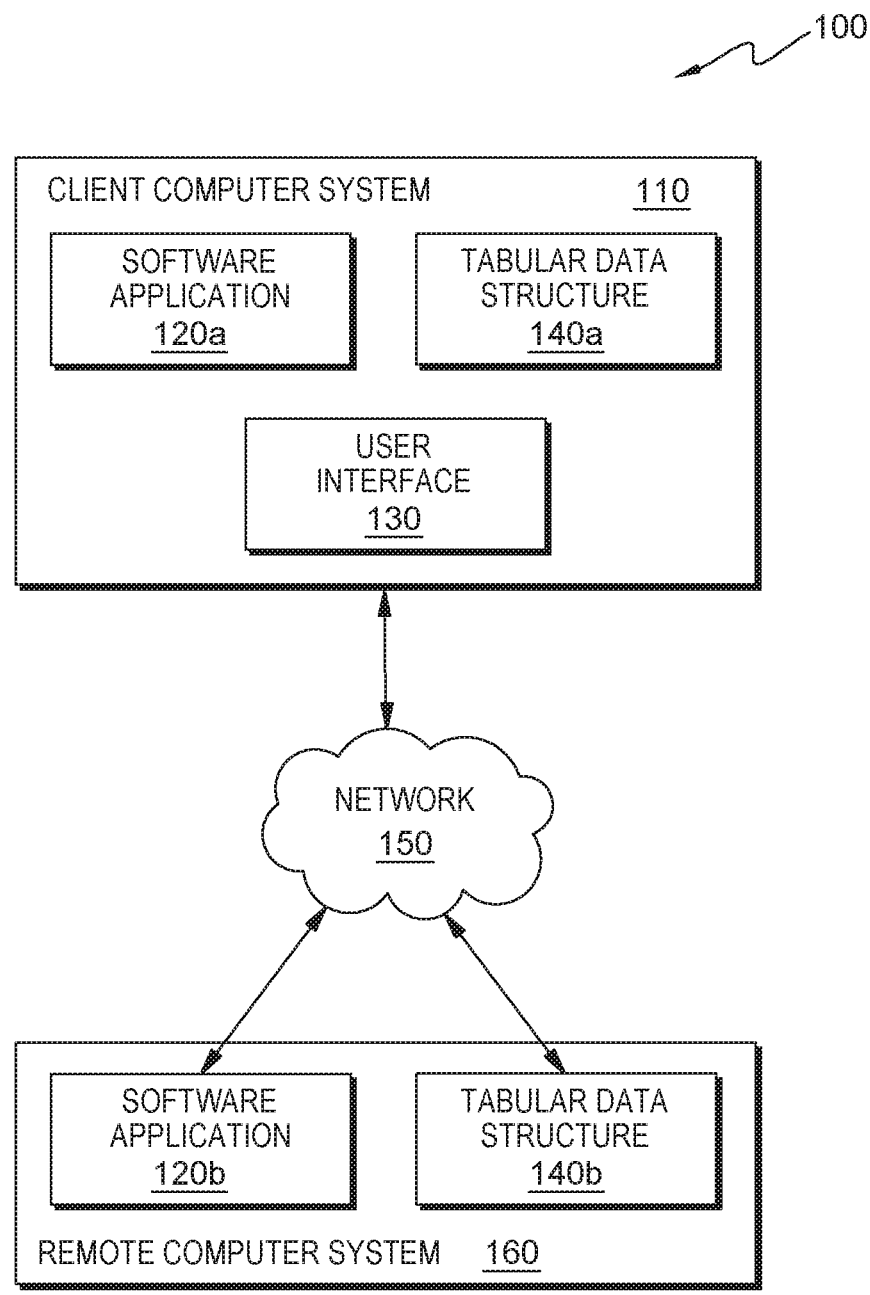
FIG. 1 is a functional block diagram depicting a computing environment in accordance with at least one embodiment of the present invention.

FIG. 1 is a functional block diagram depicting computing environment 100 in accordance with at least one embodiment of the present invention. Computing environment 100 includes client computer system 110, which can be any of a desktop computer, a laptop computer, a smartphone, a tablet computer, a specialized computer server, or any other computer system now known or to be developed in the future. In some embodiments, client computer system 110 represents a computer system utilizing clustered computers and components to act as a single pool of seamless resources when accessed through network 150. In general, client computer system 110 is representative of any electronic device, or combination of electronic devices, capable of executing machine-readable program instructions, as described in greater detail with regard to FIG. 7.

Client computer system 110 may include user interface 130 and/or software application 120a. Alternatively, in some embodiments, the software application (shown as software application 120b) may reside on remote computer system 160 that is accessible from client computer system 110 via network 150. In some embodiments of the present invention, software applications 120a and 120b are spreadsheet applications, database applications, or other software applications designed to operate on tabular data structures. Client computer system 110 may further include a tabular data structure 140a. Alternatively, in some embodiments, the tabular data structure (shown as tabular data structure 140b) may reside on a remote computer, such as remote computer system 160 that is accessible from client computer system 110 via network 150. For convenience herein, references to the software application will refer to software application 120a of client computer system 110. However, it is to be understood that the software application can be software application 120b of remote computer system 160. In like manner, references herein to tabular data will refer to tabular data structure 140a, while it is to be understood that the tabular data can be tabular data structure 140b on remote computer system 160, or any other computer system that is accessible to client computer system 110. It is to be further understood that the software application and the tabular data structure can reside on the same computer system, on different computer systems, or distributed among a plurality of computer systems.

User interface 130 enables interaction between a user (not shown in the figures) and the software application. In some embodiments, user interface 130 may be a graphical user interface configured to display tabular data (for example, a spreadsheet) in human understandable form and format and enable a user to manipulate the tabular data.

Network 150 can be, for example, a local area network (LAN), a wide area network (WAN) such as the Internet, or a combination of the two, and include wired, wireless, or fiber optic connections. In general, network 150 can be any combination of connections and protocols that will support communications between remote computer system 160 and client computer system 110 in accordance with an embodiment of the present invention.

Users editing tabular data sometimes need to insert new tabular elements between existing ones. Sometimes, the tabular elements to be inserted include an entire row (or multiple rows), or an entire column (or multiple columns) within the tabular data structure. Sometimes, the tabular elements to be inserted include a rectangular array of cells.

Some conventional software applications allow a user to insert only one tabular element, in a tabular data structure, at a time. Some software applications allow multiple row/column insertions, but the user has to go through several steps to effect the insertion, for example, steps such as: (i) select an insertion point; (ii) click an insert button or menu item; (iii) input a number in a dialog to indicate how many rows or columns to insert; (iv) click a button to confirm the insertion; and/or (v) click a new cell to begin editing.

Some embodiments of the present invention may include one, or more, of the following features, characteristics and/or advantages: (i) can be used with many types of user interface, including, for example, keyboard/mouse types of interface and touch screen types of interface; (ii) automatically calculates the number of inserted rows or columns; and/or (iii) automatically inserts the automatically calculated number of rows or columns.

Some embodiments of the present invention may recognize one, or more, of the following facts, potential problems and/or potential areas for improvement with respect to the current state of the art: (i) methods that use gestures to indicate inserting new rows/columns apply only to touch screen types of user interface; (ii) requires a user to press an input button for a pre-determined length of time, to indicate a desired insertion.

Embodiments of the present invention provide a method to quickly insert new tabular elements (rows, columns, or cells) in a tabular data structure such as a spreadsheet. For convenience, the following discussion focuses primarily on inserting rows, columns and/or rectangular arrays of cells into a tabular data structure. However, it is to be understood that the concept may also be applied to inserting, layers, worksheets, tables, or other aspects of a tabular data structure now known, or to be developed in the future.

Figure 2:
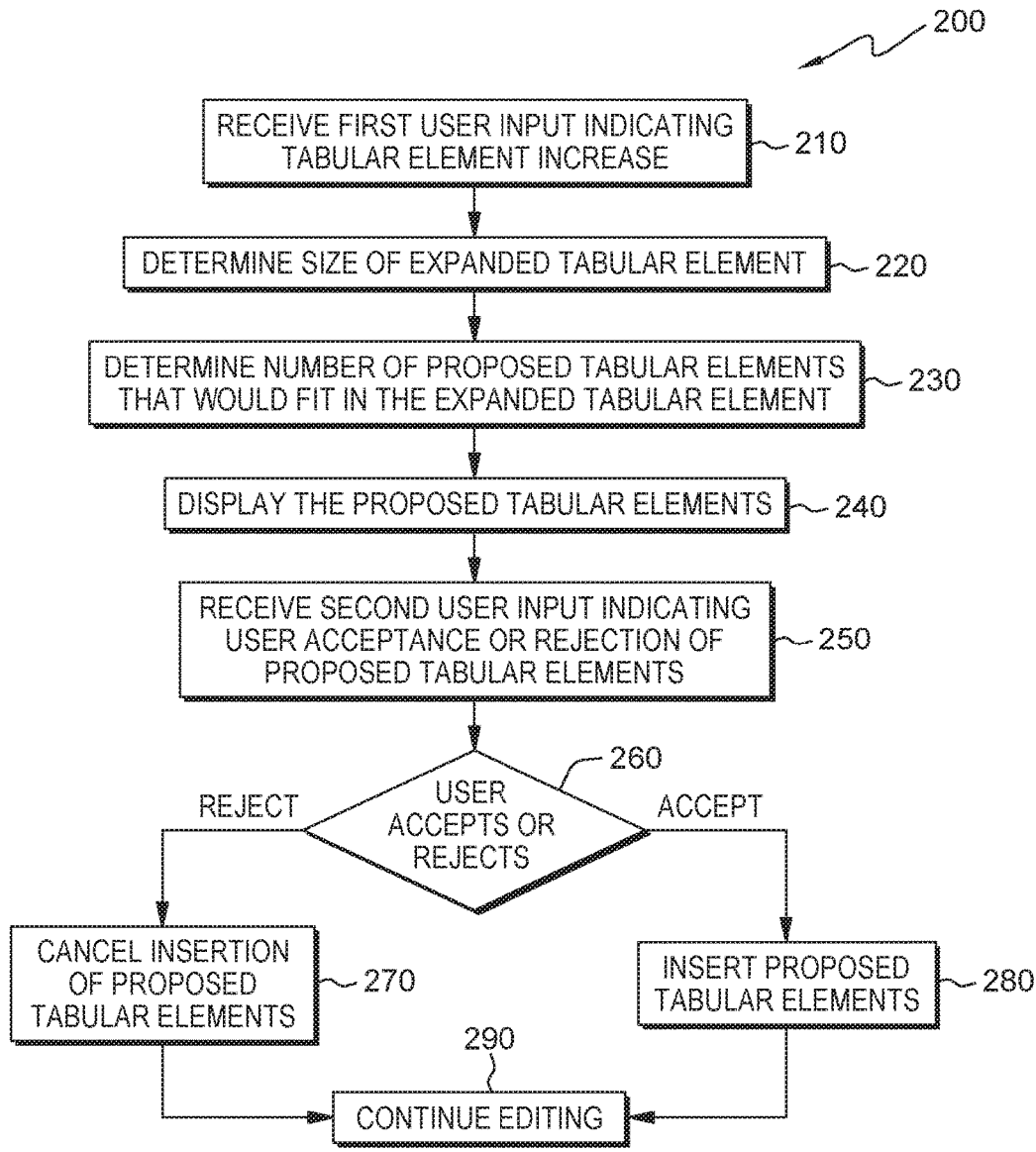
FIG. 2 is a flowchart depicting a method for inserting elements in a tabular data structure in accordance with at least one embodiment of the present invention.

A method in accordance with some embodiments of the present invention will now be discussed with reference to flowchart 200, of FIG. 2. In flowchart 200, a "tabular element" refers to a row, a column, or a contiguous rectangular array of cells of a tabular data structure such as a spreadsheet. The process begins when software application 120a (see FIG. 1) receives (210) a first user input, through user interface 130, indicating expansion of a tabular element (a row height, a column width, or a cell size (cell height and/or cell width), for example). For example: (i) the user expands a row height by pulling (or "dragging") a boundary line (for example, dragging downward the bottom boundary of a row); (ii) the user expands a column width by pulling a boundary line (for example, dragging rightward the right boundary of a column); and/or (iii) the user uses a "spread" gesture (opposite of a "pinch" gesture) to indicate expansion of a row, column, or cell, on a touch-screen or touchpad type of interface device.

Software application 120a determines (220) the expanded size of the tabular element, based on the first user input. For example, the expanded size can be determined based on how far the user drags the tabular element border or the extent of the "spread" gesture.

Software application 120a determines (230) how many proposed new tabular elements could be fitted into the expanded size of the tabular element. In some cases, this determination is based on the expanded size of the tabular element and a default size of new tabular elements. The default size of new tabular elements could be a default row height, or a default column width of the tabular data structure. The default size could be based upon user input in conjunction with the size of the expanded tabular element before it was expanded, or upon any number of other factors, some user defined, some based on software configuration settings, to name two examples.

The proposed number of new tabular elements that could be fitted into the expanded tabular element are displayed (240) visually through user interface 130 (or by other means, for example, by audible means for sight-impaired users). The application receives (250) a second user input indicating the user's acceptance or rejection of the proposed tabular elements. In some embodiments of the present invention, the user indicates acceptance of the proposed tabular elements (260, "Accept" branch) by clicking (with a mouse type of input device), or tapping (with touch screen or touchpad type of interface device) inside one of the proposed tabular elements. The user may indicate rejection of the proposed tabular elements (260, "Reject" branch) by clicking or tapping in outside of the proposed tabular elements. Alternatively, the second user input could be a predetermined keystroke (such as pressing the "enter" key) to indicate acceptance and another keystroke (such as pressing the "escape" key) to indicate rejection.

If the user accepts the proposed tabular elements (280), the application inserts new tabular elements, in place of the proposed tabular elements. If the user rejects the proposed tabular elements (270), the application removes indication of the proposed tabular elements, and leaves the expanded tabular element intact, as is done, for example, in conventional spreadsheet applications when a user expands a row height or column width. The method completes upon expansion of the tabular element (270) or insertion of new tabular elements (280), where editing continues (290) in conventional fashion.

It is noted here that expanding a tabular element (row, column or cell size) generally affects only the manner in which the tabular data structure is displayed in a user interface device. It does not affect the data. On the other hand, inserting new tabular elements (rows, columns, cells) effects the data structure in that new tabular elements are added, and existing tabular elements are assigned to new positions within the data structure.

Some embodiments of the present invention may include one, or more, of the following features, characteristics and/or advantages: (i) requires fewer steps than conventional methods; (ii) can be implemented with any type of user interface; (iii) does not require selection of menu items, or entry of numerical inputs.

Some embodiments of the present invention include only two steps. For example, to insert multiple lines, the steps are as follows: (i) pull down the bottom boundary of a row to expand the row; and (ii) supply a pre-determined user input.

In response to step (i) in the paragraph above, dashed lines can be displayed to propose that the expanded row be divided into multiple rows. In some embodiments of the present invention, the existing (expanded) row is shown as one of the multiple rows. In other embodiments of the present invention, the existing (expanded) row is shown in addition to the multiple rows. The greater the row expansion is, the greater number of new rows are proposed. Alternatively, any number of different techniques, now known or to be developed in the future, can be used to indicate proposed division of the expanded row.

In step (ii) above, pre-determined user input indicates user selection among at least two options. One user input, (for example, pressing the "Enter" key, or clicking inside the expanded row) indicates user acceptance of the proposed new tabular elements (rows in this example). A different user input, (for example pressing the "escape" key, or clicking outside the expanded tabular element) indicates user rejection of the proposed new multiple tabular elements. In the "rejection" case, the expanded tabular element remains intact, that is: (i) it is not divided into multiple tabular elements; and (ii) it assumes its expanded size.

Many variations can be implemented in embodiments of the present invention. In some embodiments, user preferences can be set that map user inputs to their detailed actions with respect to the present invention. For example, if a user is using mouse and keyboard, the user could "press the Ctrl key while resizing an tabular element" to indicate that the user wants to insert new tabular elements, whereas "not pressing the Ctrl key while resizing an tabular element" means that the user wants merely to resize the tabular element. In this embodiment, only one step (pressing the Ctrl key while expanding the row) is required. In an alternative example, if a user is using a tablet computer or a smartphone, "gestures" can be used to indicate user intent. For example, a "spread" gesture can be used to expand a row and a "double-tap" gesture inside the expanded row indicates acceptance of proposed new rows to be inserted adjacent to the expanded row.

Figure 3:
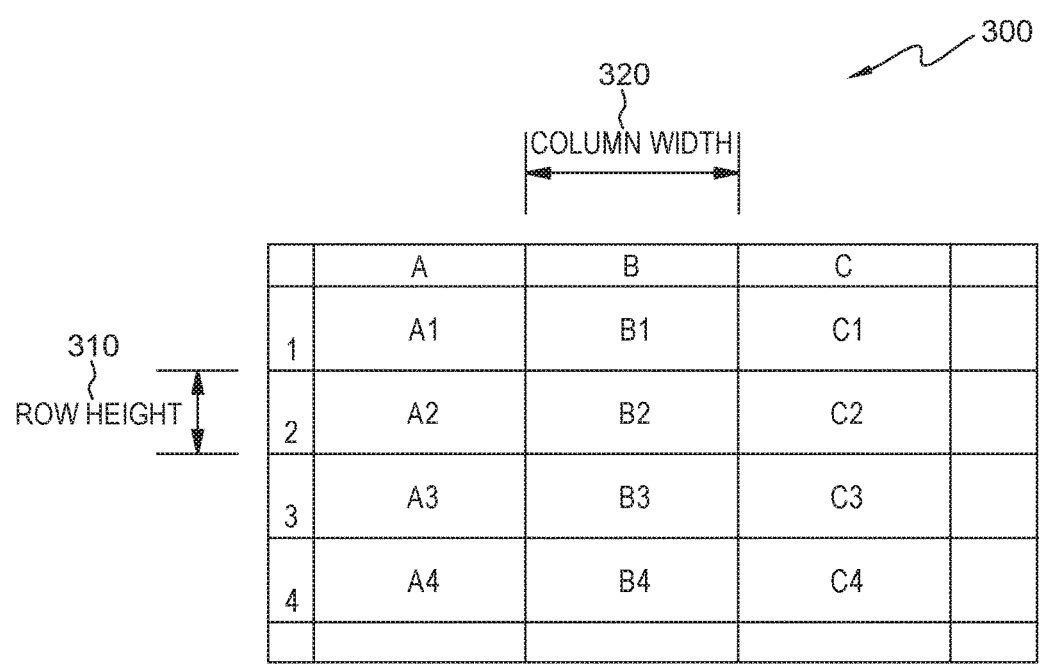
FIG. 3 is a screenshot depicting a portion of a tabular data structure in accordance with at least one embodiment of the present invention.

Referring now to FIG. 3, screenshot 300 depicts a portion of a tabular data structure. Vertical dimension 310 indicates what herein is meant by "row height" (or cell height, or tabular element height). In some embodiments of the present invention, the vertical dimension applies to all cells in the corresponding row. In other embodiments of the present invention, cells in the corresponding row may have differing heights.

Horizontal dimension 320 depicted in screenshot 300 indicates what herein is meant by "column width" (or cell width, or tabular element width). In some embodiments of the present invention, the horizontal dimension applies to all cells in the corresponding column. In other embodiments of the present invention, cells in the corresponding column may have differing widths.

Figure 4:
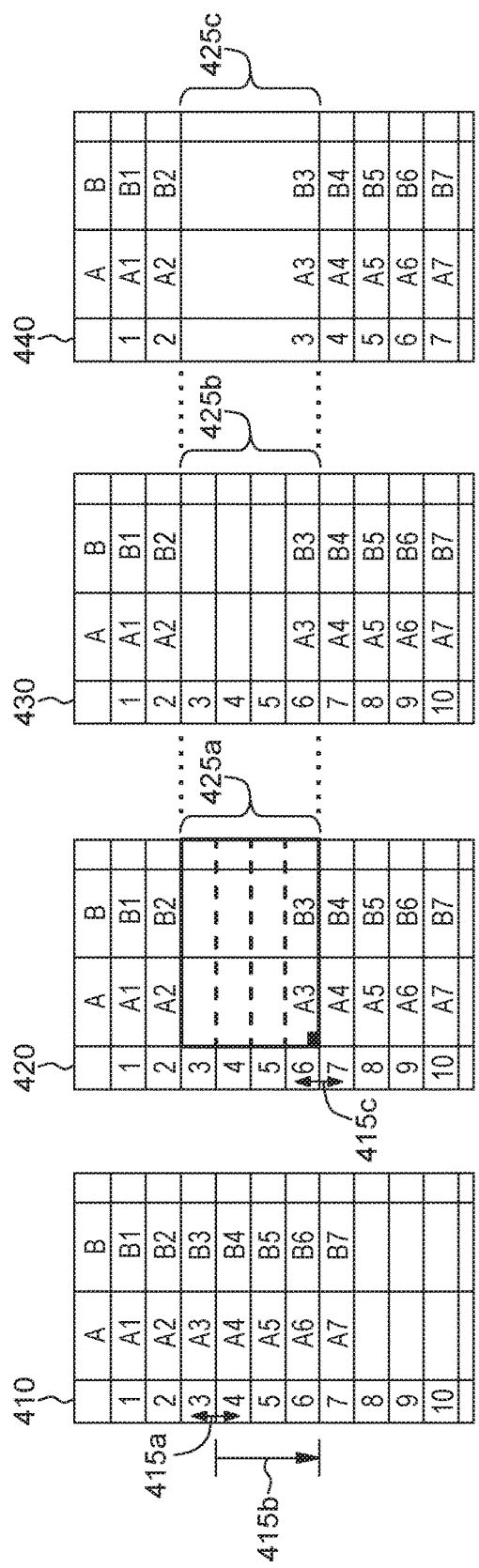
FIG. 4 is a series of screenshots depicting a row insertion sequence in accordance with at least one embodiment of the present invention.

FIG. 4 is series of screen shots generated by some embodiments of the present invention. Screenshot 410 shows a portion of a tabular data structure before actions, in accordance with embodiments of the present invention, take place. The cursor is positioned at the bottom border of row 3 as indicated by cursor position 415a.

Screenshot 420 shows an effect of vertically expanding row 3 by pulling downward the bottom border of row 3, in the direction of motion 415b, to the position as indicated by cursor position 415c of screenshot 420.

Area 425a of screenshot 420 is automatically divided into proposed new rows (rows 3, 4, 5, and 6). The (at least potentially) expanded row 3 is shown as an unexpanded row 6. The height and number of the proposed new rows are determined based on the height of area 425a and a default row height. (Alternatively, in some embodiments, the height of the new rows is determined based on other factors, such as the height of row 3 before it was expanded.)

Once row 3 has been expanded, the user may choose from options including: (i) accept automatic insertion of the proposed rows into the tabular data structure; or (ii) reject insertion of the proposed rows.

Screen shot 430 shows an effect on the tabular data structure if the user accepts automatic insertion of the proposed rows. The proposed rows of area 425a (screenshot 420) are converted into new rows (area 425b of screenshot 430) and the new rows are inserted into the tabular data structure. New rows 3, 4, and 5 are inserted between the original rows 2 and 3 of screenshot 410. Data originally in row 3 of screenshot 410 is now positioned in row 6 of screenshot 430, and data in the rows below the original row 3 are now positioned in rows below row 6, in the same position relative to row 6, and to each other, as they held relative to the original row 3.

Screenshot 440 shows an effect on the tabular data structure resulting from the user rejecting automatic insertion of the proposed rows. Row 3 (425c) is now expanded as shown in screenshot 440.

Figure 5:
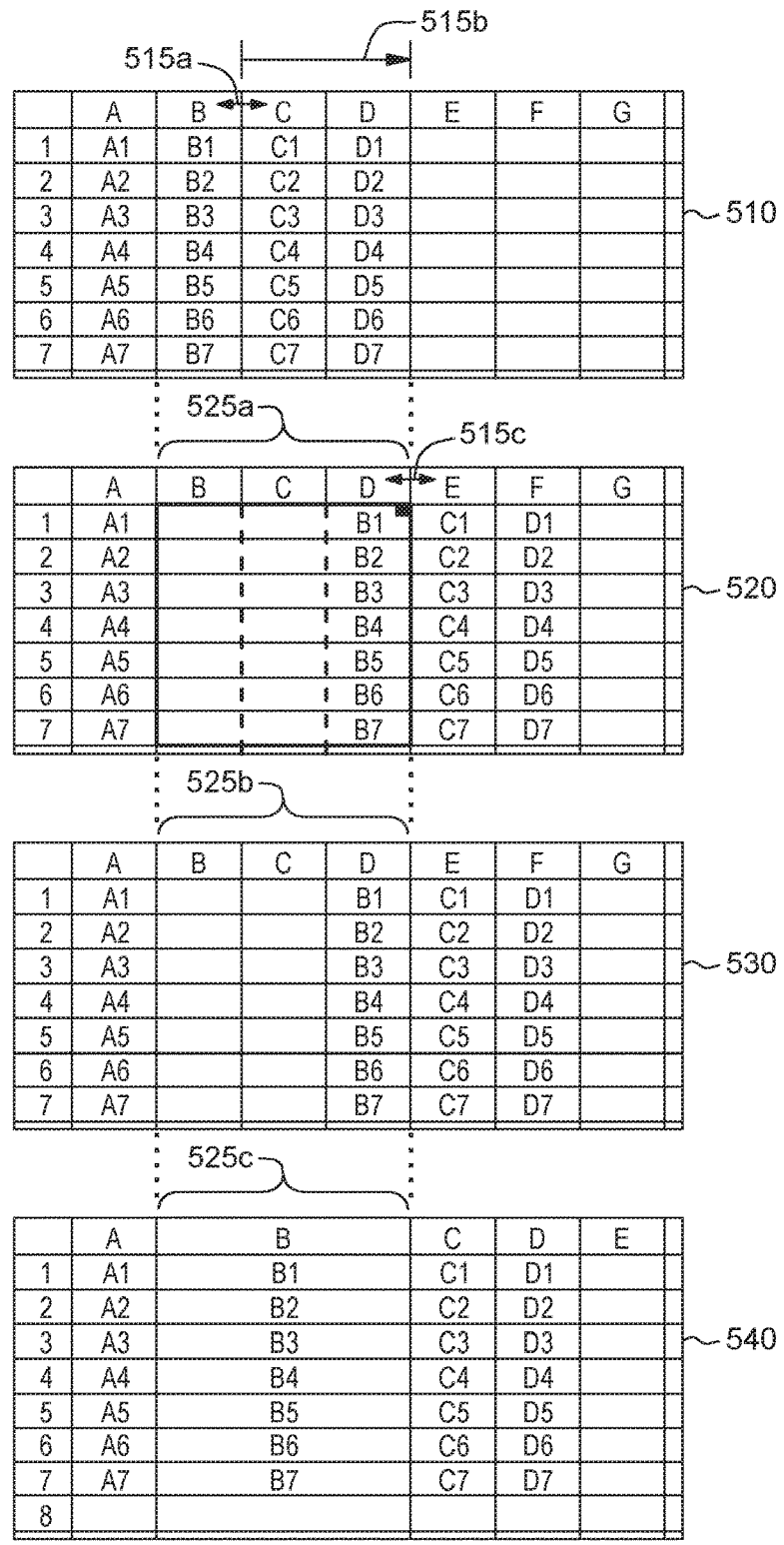
FIG. 5 is a series of screenshots depicting a column insertion sequence in accordance with at least one embodiment of the present invention.

FIG. 5 is series of screen shots generated by some embodiments of the present invention. Screenshot 510 shows a portion of a tabular data structure before actions, in accordance with embodiments of the present invention, take place. The cursor is positioned at the right-hand border of column B as indicated by cursor position 515a.

Screenshot 520 shows an effect of horizontally expanding column B by pulling the right-hand border of column B rightward, in the direction of motion 515b, to the position as indicated by cursor position 515c of screenshot 520.

Area 525a of screenshot 520 is automatically divided into proposed new columns (columns B, C, and D). The (at least potentially) expanded column B is shown as unexpanded column D. The width and number of the proposed new columns are determined based on the width of area 525a and a default column width. (Alternatively, in some embodiments, the width of the new columns is determined based on other factors, such as the width of column B before it was expanded.)

Once column B has been expanded, the user may choose from options including: (i) accept automatic insertion of the proposed columns into the tabular data structure; or (ii) reject insertion of the proposed columns.

Screen shot 530 shows an effect on the tabular data structure if the user accepts automatic insertion of the proposed columns. The proposed columns of area 525a (screenshot 520) are converted into new columns (area 525b of screenshot 530) and inserted into the tabular data structure. New columns B, and C are inserted between the original columns A and B of screenshot 510. Data in the original column B of screenshot 510 is now positioned in column D of screenshot 530. Data in columns to the right of the original column B are now positioned in columns to the right of column D, retaining the same positions relative to column D, and to each other, as they held relative to the original column B.

Screenshot 540 shows an effect on the tabular data structure resulting from the user rejecting automatic insertion of the proposed columns. Column B (525c) is now expanded as shown in screenshot 540.

FIG. 6 is a series of screen shots generated by some embodiments of the present invention. Screenshot 610 shows a portion of a tabular data structure before actions, in accordance with embodiments of the present invention, take place. The cursor is positioned at the lower right-hand corner of cell B3 as indicated by cursor position 615a.

Screenshot 620 shows an effect of expanding cell B3 by pulling the lower right-hand corner of cell B3 diagonally to the right and downward, in the direction of motion 615b, to the position as indicated by cursor position 615c of screenshot 620.

Area 625a of screenshot 620 is automatically divided into proposed new cells (cells B3-B5, C3-C5, and D3-D5). The size (height and width) and number of the proposed new cells is based on the heights of the affected rows (rows 3, 4 and 5) and the widths of the affected columns (columns B, C, and D) surrounding area 625a.

Once cell B3 has been "expanded," area 625b of screenshot 630 is displayed with proposed new cells indicated by the dashed lines as shown in the screenshot. The user may then choose from options including: (i) accept automatic insertion of proposed new cells, by shifting to the right the contents of the cells of area 625a; (ii) accept automatic insertion of new cells, by shifting downward data in cells below area 625a (this option is not shown in the Figures); (iii) accept automatic insertion of new cells, by inserting new column(s) between original columns A and B, and inserting new row(s) between original rows 2 and 3 (this option is not shown in the Figures); (iv) expand column B to the width indicated by the horizontal component of motion 615b and expand row 3 to the height indicated by the vertical component of motion 615b; or (v) cancelling the operation. Further with respect to option (i) above, in some embodiments of the present invention, the user indicates acceptance of this option by clicking on the right-hand border of area 625a. Further with respect to option (ii) above, in some embodiments of the present invention, the user indicates acceptance of this option by clicking on the lower border of area 625a. The options presented in this paragraph do not constitute an exhaustive list. There are many possible options in addition to those listed above, (and many possible actions that can be used to indicate user acceptance of any particular option) that fall within the scope of embodiments of the present invention.

Screen shot 640 shows an effect on the tabular data structure if the user accepts automatic insertion of the proposed cells. The proposed cells of area 625b (screenshot 630) are converted into new cells (area 625c of screenshot 640). New cells B3 through D5, are inserted into the tabular data structure. The original contents in those cells (area 625b of screenshot 630) are displaced to the right as shown in screenshot 640, retaining the same position relative to each other, as they held before the insertion.

In some embodiments of the present invention, there are various ways that a user may indicate rejection of the proposed new rows columns or cells, for instance, by selecting a cell outside of the proposed new rows, columns, or cells.

In some embodiments of the present invention, there are various ways that a user may indicate acceptance of the proposed new rows, columns or cells, for instance, by selecting a cell inside one of the proposed new rows, columns, or cells.

In another embodiment, the user configures the software application to trigger insertion of new tabular elements (rows, columns or cells), when the user presses a "hot key" while simultaneously resizing a tabular element. In this embodiment, a "canceling" action is rendered unnecessary.

In some embodiments of the present invention, the software application is configured to determine the size of proposed new tabular elements, with the determination based on: (i) a default size; (ii) an average size of certain tabular elements; (iii) a user-specified size; and/or (iv) any other method that is automatically determinable by the software, based on user input and/or application configuration settings.

In some embodiments of the present invention, the application calculates the number of potential new rows/columns/cells, and shows dashed lines to indicate the potential new rows/columns/cells. If the user cancels (rejects the proposed new rows/columns/cells), there is no change of the current data. If the user accepts the proposed new rows/columns/cells, the software application will modify the tabular data structure (meaning links, formulas, formatting, references and/or any other data associated with the affected cells existing in the data before the insertion are updated to maintain integrity of the data after the insertion) and insert the newly added rows, columns, or cells.

Some embodiments of the present invention may include one, or more, of the following features, characteristics and/or advantages: (i) is usable and convenient for any type of user interface including keyboard/mouse, keyboard/touchpad, and touchscreen types of user interface; (ii) displays graphic information to mark out the size and position of new tabular element, but the tabular elements are not actually inserted until the user confirms the change; (iii) does not require a pre-determined pressing time to indicate that the user wants to insert new tabular elements; (iv) saves a significant amount of time in cases where frequent and numerous insertions are needed; (v) in embodiments where a user confirms the insertion by selecting a proposed new cell, the user can immediately begin to edit the selected cell.

Some embodiments of the present invention apply to various software applications including spreadsheet applications, office type applications (word processors, presentation applications, etc.), and other applications in which information is displayed as cells arranged in rows and columns (for example, a table in a word processing application, a database table, etc.).

Some embodiments of the present invention may include one, or more, of the following features, characteristics and/or advantages: (i) inserts any number of new tabular elements with simple and quick actions; (ii) when a user expands an tabular element, an insertion preview is triggered; (iii) if the user confirms the insertion preview, the actual inserting is performed; (iv) if the user rejects the preview, the insertion is canceled; (v) the preview enables a user to see the visual effect before the actual insertion is performed; (vi) can be used with various types of user interface, including mouse/keyboard, touch screen and touchpad types of user interface; (vii) when a user expands a tabular element size, there is displayed a visual indication (for example, dashed lines automatically overlaid on the expanded tabular element) that previews potentially inserted tabular elements; (viii) a user can choose to press a specified key (for example "Ctrl" key), while expanding the tabular element, to trigger an insertion action; (ix) the method can visually show the quantity of potential new tabular elements and adjust the quantity if the user changes the expanding scale; (x) a user can choose to confirm or cancel the insertion of the potential new tabular elements with another quick action, such as: (a) no action at all to confirm, pressing "Esc" or another hot key to cancel; (b) pressing a specified hot key to confirm, no action to cancel; (c) clicking the mouse left/right button respectively to confirm/cancel; (d) clicking the mouse while the cursor is positioned inside the proposed new tabular element area to confirm, and clicking the mouse while the cursor is positioned outside the new tabular element area to cancel, etc.

In some embodiments of the present invention, the preview of potential new tabular elements is temporary. Before the user confirms, no data in the tabular data structure is changed until and unless the user confirms (either affirmatively or by default) the change. If the user confirms the insertion, real data is added (new tabular elements are inserted) and the view of the data is changed at once, in accordance with the preview.

Figure 7:
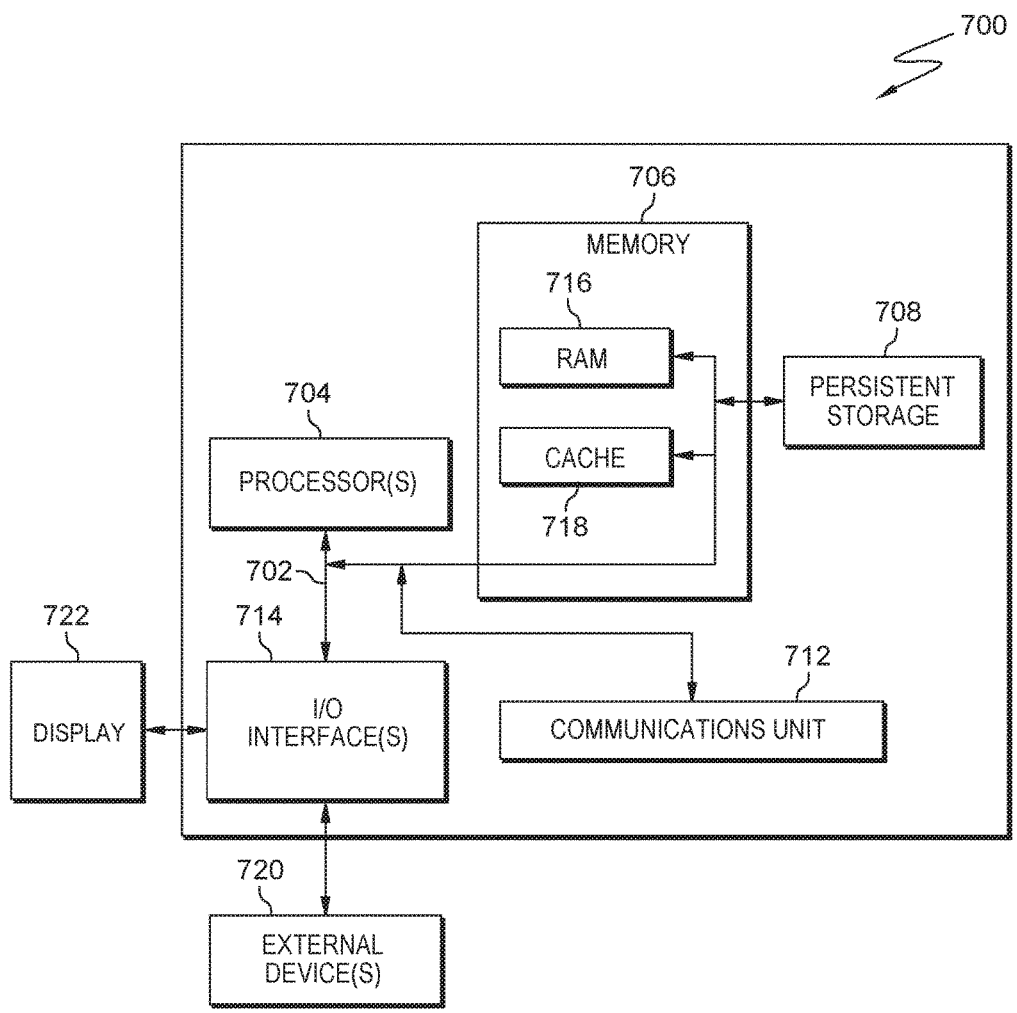
FIG. 7 is a block diagram depicting components of a computer, in accordance with at least one embodiment of the present invention.

FIG. 7 depicts a block diagram of components of computer 700 in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

As depicted, the computer 700 includes communications fabric 702, which provides communications between computer processor(s) 704, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 716 and cache memory 718. In general, memory 706 can include any suitable volatile or non-volatile computer-readable storage media.

One or more programs may be stored in persistent storage 708 for access and/or execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links.

I/O interface(s) 714 allows for input and output of data with other devices that may be connected to computer 700. For example, I/O interface 714 may provide a connection to external devices 720 such as a keyboard, keypad, a touch screen, and/or some other suitable input device. External devices 720 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 708 via I/O interface(s) 714. I/O interface(s) 714 also connect to a display 722.

Display 722 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

What is claimed is:

1. A computer program product for inserting one or more tabular elements in a tabular data structure, the computer program product comprising a computer readable storage medium having stored thereon instructions to perform:
   receiving a first user input indicating an increase in a size of a first tabular element with respect to at least one dimension;
   determining an expanded first tabular element size based at least in part on the first user input;
   determining a plurality of proposed new tabular elements, including a first proposed new tabular element, that would fit within the expanded first tabular element size;
   displaying the plurality of proposed new tabular elements overlaid on the expanded first tabular element;
   receiving a second user input;
   on condition the second user input indicates acceptance of the plurality of proposed new tabular elements, inserting the plurality of proposed new tabular elements in the tabular data structure, where acceptance is indicated by selection of the first proposed new tabular element;
   on condition the second user input indicates rejection of the plurality of proposed new tabular elements, expanding the first tabular element size to the expanded first tabular element size, where rejection is indicated by selection of a tabular element not included in the plurality of proposed new tabular elements;
   wherein:
      a user input comprises one or more of a keystroke, a touchscreen gesture, and a mouse click,
      the plurality of proposed new tabular elements comprise one or more horizontal rows of the tabular data structure,
      the plurality of proposed new tabular elements comprise one or more vertical columns of the tabular data structure, and
      the tabular data structure is a spreadsheet or table.

* * * * *